United States Patent [19]

Nakai et al.

[11] Patent Number: 5,126,775
[45] Date of Patent: Jun. 30, 1992

[54] LENS-FITTED PHOTOGRAPHIC FILM PACKAGE AND METHOD OF FILM RELOADING THEREFOR

[75] Inventors: Norihiro Nakai; Tatsuya Mochizuki, both of Kanagawa, Japan

[73] Assignee: Fuji Photo Film Co., Ltd., Kanagawa, Japan

[21] Appl. No.: 711,050

[22] Filed: Jun. 6, 1991

[30] Foreign Application Priority Data

Jun. 6, 1990 [JP] Japan .................. 2-60070[U]
Jul. 2, 1990 [JP] Japan .................. 2-70410[U]

[51] Int. Cl.⁵ ........................................ G03B 17/02
[52] U.S. Cl. ............................................. 354/288
[58] Field of Search ................................ 354/288

[56] References Cited

U.S. PATENT DOCUMENTS

| | | | |
|---|---|---|---|
| 4,110,770 | 8/1978 | Lange | 354/288 X |
| 4,742,366 | 5/1988 | Nakazawa | 354/288 X |
| 4,890,130 | 12/1989 | Takei et al. | 354/288 |
| 4,896,178 | 1/1990 | Ohmura et al. | 354/288 |
| 5,049,914 | 9/1991 | Dassero | 354/288 |
| 5,063,400 | 11/1991 | Takei et al. | 354/288 |

*Primary Examiner*—Michael L. Gellner
*Attorney, Agent, or Firm*—Young & Thompson

[57] ABSTRACT

An L-shaped rear cover is removably attached to a main body so as to close the rear and bottom sides of the main body. The rear cover is formed with at least one engaging hole or engaging claw engaging with the main body. Near the engaging member, there is a groove for providing a thin wall portion in the rear cover. When detaching the rear cover from the main body for film reloading, the rear cover is deformed or broken along the groove. After the main body is loaded with a new film, a new rear cover is attached to the main body thereby to produce a new film package with a reused main body. In order to reuse the rear cover, the rear cover has an L-shaped engaging claw engaging with an engaging hole in the main body, the L-shaped engaging claw being deformable within that engaging hole.

18 Claims, 10 Drawing Sheets

F I G. 1
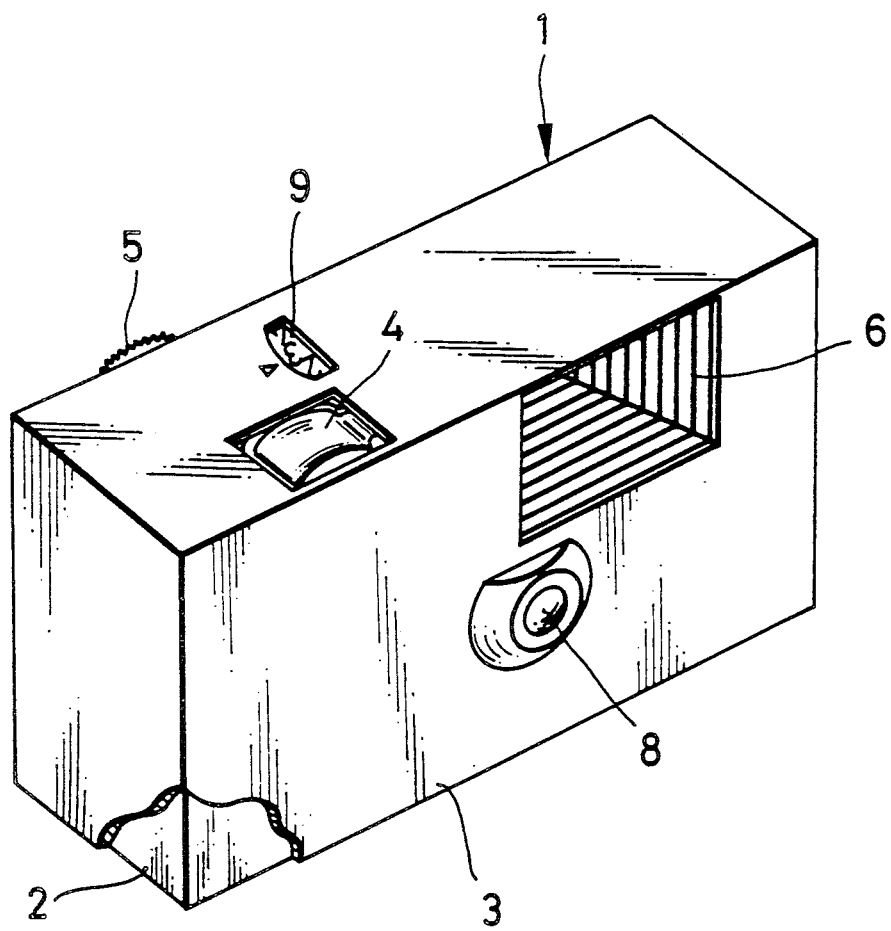

LENS-FITTED PHOTOGRAPHIC FILM PACKAGE AND METHOD OF FILM RELOADING THEREFOR

BACKGROUND OF THE INVENTION

1. Field of the Invention

The present invention relates to a lens-fitted photographic film package that can take pictures, and also to a method of film reloading therefor. The present invention relates especially to a lens-fitted photographic film package wherein a light-shielding cover is removable from a main body such that the main body is reusable, and to a method of reloading a new photographic film into the lens-fitted photographic film package.

2. Description of the Prior Art

Lens-fitted photographic film packages (hereinafter called simply film packages), in which a photographic film is previously loaded and simple exposure mechanisms are incorporated, are now on the market, which are intended to make it possible to take pictures whenever desired without buying or carrying about an expensive and heavy camera. For this purpose, the price of the film package should not be much more than that of a 135-type color photographic film. Therefore, the film packages are so constructed as to simplify the incorporated exposure mechanisms and to make the manufacture thereof inexpensive.

Such film packages consist of a film housing and an outer casing which is decorative and which bears any desired indicia. The film housing consists of a main body provided with exposure mechanism such as a shutter, a taking lens, a film advancing mechanism and so forth, a front cover attached to the front of the main body, and a rear cover attached to the rear of the main body. The rear cover is attached to the main body after a photographic film is loaded in the main body, and thus is used as a light-shielding cover for covering open portions of the main body, for example, the rear and bottom sides thereof, in a light-tight fashion. Since it has conventionally been sought merely to minimize the cost of the film package, and the film package was not intended to be used repeatedly, the rear cover of the conventional film package could not be repeatedly opened and closed. Instead, the rear cover was tightly attached to the main body, for example, by the engagement of claws in holes.

In such known film packages, the exposed film need not be rewound nor be removed from the film housing, and the film package containing the exposed film is forwarded to a photofinishing laboratory for development. In the photofinishing laboratory, a part of the rear cover is opened to take out a film cassette containing the exposed film so as to permit development and printing of the exposed film. The film housings have conventionally been thrown away after the removal of film cassette, and only the developed films and the photographic prints are returned to the customer.

The main body and the front and rear covers of such film packages are made from synthetic resin materials, so that a large amount of synthetic resin waste is generated by the photofinishing laboratories. This is undesirable from a standpoint of environmental protection. Because it is a pressing necessity to reduce such industrial waste, recovery of the waste materials and recycling of the reusable parts of the film package are desirable. Especially the main body, because it includes the exposure mechanism such as the shutter, the taking lens and so forth, is worth reusing, compared to the front and rear covers, which are each formed as one piece and which can be discarded with relatively little loss.

In order to reuse the main body, it is necessary to remove the rear cover from the main body so as to reload a new film. Although it is possible to remove the rear cover from the main body by pushing a tool such as a screwdriver into the gap between the hole and the claw so as forcibly to release the tight engagement of the rear cover with the main body, this may damage the main body and, therefore, would not be reliable as a method for reusing the main body.

SUMMARY OF THE INVENTION

It is, therefore, the main object of the present invention to provide a film package whose light-shielding cover is easily removable from the main body thereof.

Another object of the present invention is to provide a film package of which not only the main body but also the light-shielding cover are reusable.

Still another object of the present invention is to provide a method of film reloading for a film package which minimizes the need for new parts for making a recycled film package.

The above and other objects are achieved according to the present invention, by providing the main body and the rear cover with respective engaging members which can be engaged with each other so as to attach the rear cover to the main body and, at the same time, by forming a thin wall portion near the engaging member of the rear cover, the thin wall portion being deformable under external force as to disengage the rear cover form the main body.

According to a preferred embodiment of the present invention, the rear cover is of substantially L-shape, and consists of a back wall section and a bottom wall section which are formed as one body, wherein the back wall section light-tightly covers the rear side of the main body, and the bottom wall section is fitted to the bottom center portion of the main body. The bottom wall portion is formed with at least an engaging member, and the thin wall portion is formed in a line between an interconnecting edge of the rear and bottom wall portions, on the one hand, and the engaging member, on the other hand.

According to a further preferred embodiment of the present invention, one of the light-shielding cover and the main body is formed with engaging claws, while the other is formed with engaging holes. The engaging claws protrude substantially perpendicular form the surface of the light-shielding cover or the main body on which the claws are formed, and slits are formed in that surface such that the engaging claws have an L-shape as a whole, and are deformable by a force applied to the upper arm portion of the L-shaped claws. The engaging holes are large enough o provide play between the margins of the holes and the engaging claws inserted therein, thereby to allow deformation of the engaging claws. When the claws are deformed in the holes, the engaged portion of the engaging claws is disengaged from the engaging holes.

A film reloading method of the present invention comprises the steps of deforming or breaking a part of the light-shielding cover into a non-reusable condition thereby to detach the light-shielding cover from the main body, loading the main body with a new film, and thereafter attaching a new light-shielding cover to the main body thereby to shield the interior of the main body from ambient light.

According to the present invention, it is possible to detach the light-shielding cover of the film package from the main body without damaging the main body. Therefore, the main body can be reused to manufacture a new film package. Because the light-shielding cover has a simple construction, using a new light-shielding cover does not greatly increase the cost of a reused film package. Accordingly, the present invention contributes greatly to the reduction of industrial waste as well as to the conservation of natural resources.

BRIEF DESCRIPTION OF THE DRAWINGS

The above and other objects and advantages of the present invention will become apparent from the following detailed description of preferred embodiments when read in conjunction with the accompanying drawings, in which the same or like parts are designated by the same reference numerals throughout the drawings, wherein:

FIG. 1 is a perspective view of a film package according to the present invention;

DETAILED DESCRIPTION OF THE PREFERRED EMBODIMENTS

Figure 2:
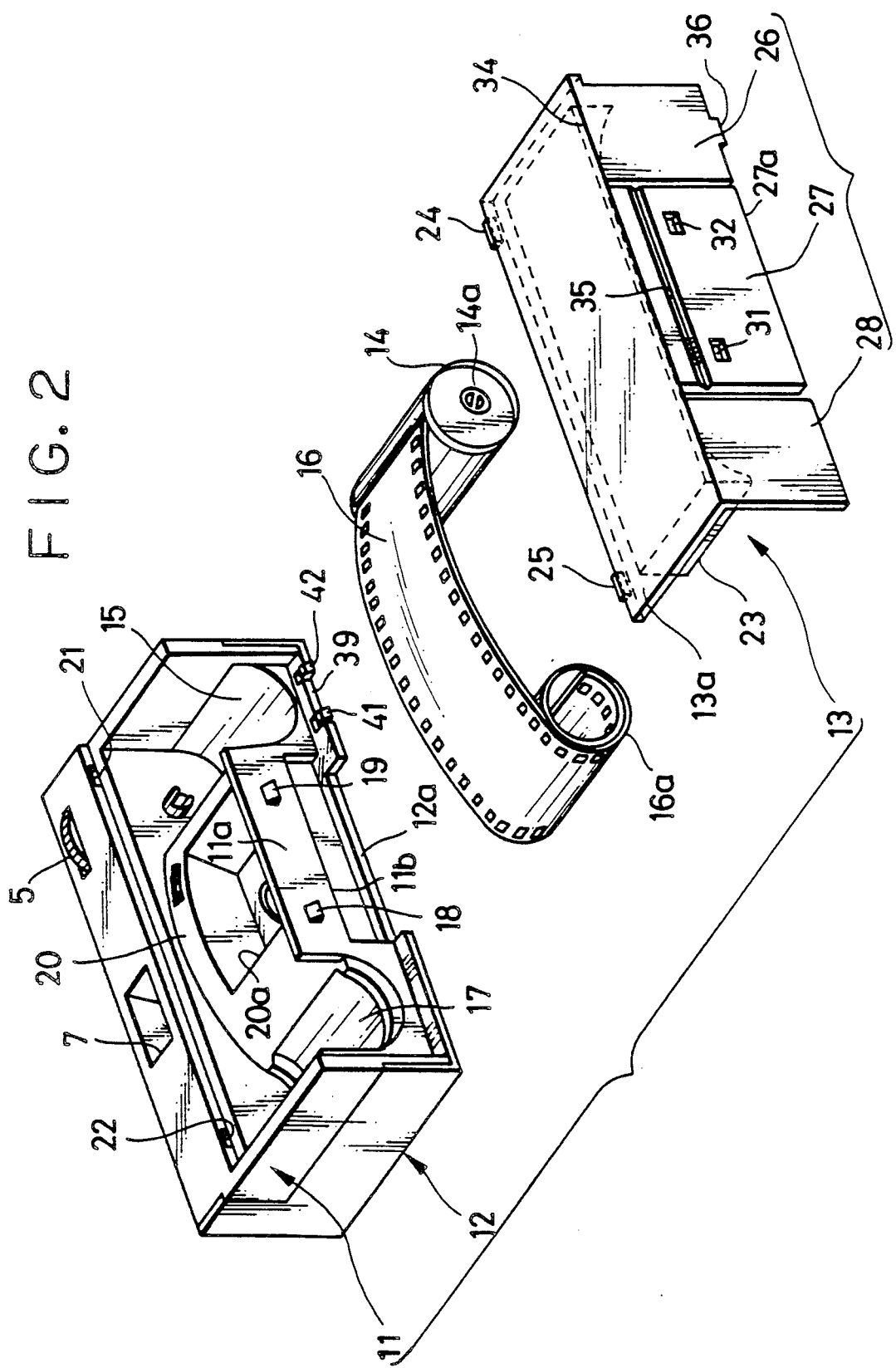
FIG. 2 is an exploded perspective view of the film housing shown in FIG. 1.

In FIG. 1 showing a film package 1 of the present invention, the film package I comprises a film housing 2 having exposure mechanism and an outer casing 3 in which the film housing 2 is encased tightly. The outer casing 3, which is intended to decorate the film package 1, is a cardboard box or the like having ornamental patterns and information printed thereon. The outer casing 3 is formed with openings for exposing a shutter release button 4, a film advancing wheel 5, a finder window 6, a look-in finder window 7 (see FIG. 2), a taking lens 8 and a film frame counter 9, so that the user can operate the film package 1 to take pictures without removing the outer casing 3. Of course, it is possible to remove or eliminate the outer casing 3 as it has no bearing on photography. Instead of the outer casing 3, it is possible to adhere decorative printed paper to a part of the outer surface of the film housing 2.

Referring to FIG. 2, the film housing 2 comprises a main body 11, a front cover 12 attached to the front of the main body 11, and a rear cover 13 attached to the rear of the main body 11. The main body 11, the front cover 12 and the rear cover 13 are each formed as one piece made of plastic. The main body 11 has mounted thereon mechanisms necessary for photographing such as the taking lens 8, a shutter mechanism, a film advancing mechanism and the film frame counter 9. The main body 11 is also provided with a cassette chamber 15 for accommodating a film cassette 14, a film roll chamber 17 for accommodating an unexposed photographic film 16 which has been withdrawn from the film cassette 14 and wound into a roll 16a, and an exposure frame 20 disposed between these chambers. The exposure frame 20 is formed with an exposure opening 20a through which light from the taking lens 8 travels to the photographic film 16, for example, a 135-type film (35 mm film). It may be desired to provide a rotatable shaft in the film roll chamber 17 so as to wind the unexposed film 16 thereon.

The rear side of the main body 11 and the bottoms of the cassette chamber 15 and the film roll chamber 17 are open. In order to close these open portions light-tightly, the rear cover 13 is removably attached to the main body 11. A bottom plate 11a of the main body 11 has engaging claws 18 and 19 formed integrally therewith, for engaging the rear cover 13. On the top wall portions of the film cassette and film roller chambers 15 and 17, there are engaging holes 21 and 22 which are used to attach the rear cover 13 to the main body 11.

The rear cover 13 comprises a back wall portion 13a and a bottom wall portion arranged to form an approximately L-shaped body. The back wall portion 13a is fitted to the rear of the main body 11. A film guide portion 23 having a concave front surface is formed inside the back wall portion 13a integrally therewith, so that a curved film passage is formed between the film guide portion 23 and the exposure frame 20. This helps to correct the distortion of the taking lens 8. On the top edge of the back wall portion 13a, there are projections 24 and 25 formed integrally therewith, which correspond to the engaging holes 21 and 22, respectively.

The bottom wall portion comprises a pivotally openable bottom lid 26 closing the open bottom end of the cassette chamber 15, a center cover plate 27 fitted to the bottom of the exposure frame 20, and a cover plate 28 closing the open bottom end of the film roll chamber 17. The bottom lid 26 and the cover plate 28 are not necessarily formed integrally with the rear cover 13, but may be formed each as a separate piece. The center cover plate 27 is formed with engaging holes 31 and 32 disposed correspondingly to the engaging claws 18 and 19, respectively. Thus, the rear cover 13 can be attached removably to the main body 11 through engagement of the engaging holes 21, 22 with the projections 24, 25 as well as engagement of the engaging claws 18, 19 with the engaging holes 31, 32.

Between the engaging holes 31 and 32 of the bottom wall portion, on one hand, and the bottom edge 34 of the back wall portion 18a, on the other hand, there is a groove 35 extending parallel to the bottom edge 34 in the center cover plate 27. The groove 35 provides a thin wall portion in the center cover plate 27, and facilitates deforming or bending the center cover plate 27 along the groove 35. The section of the groove may be of V-shape, U-shape, or arcuate or the like. A free end 27a of the center cover plate 27 opposite the bottom edge 34 is located in a cut-out 12a formed in the center of the bottom edge of the front cover 12, so that the end surface of the free end 27a is exposed outwards. By pushing the free end 27a apart from the main body 10 by means of a tool such as a screwdriver or a finger, the center cover plate 27 is easily deformed or bent along the groove 35, thereby disengaging the engaging claws 18 and 19 from the engaging holes 31 and 32. In this way, the rear cover 13 is easily removable from the main body 10. The cut-out 12a may be so large as to provide a gap between the front cover 12 and the center cover plate 27. This gap facilitates the insertion of the screw driver or the like. The free end 27a of the center cover plate 27 may be in alignment with the front edge 11b of the bottom plate 11a, but the free end 27a is flush with the front wall of the front cover 12 according to the present embodiment. This embodiment makes it easier to deform or break the center cover plate 27.

Figure 3:
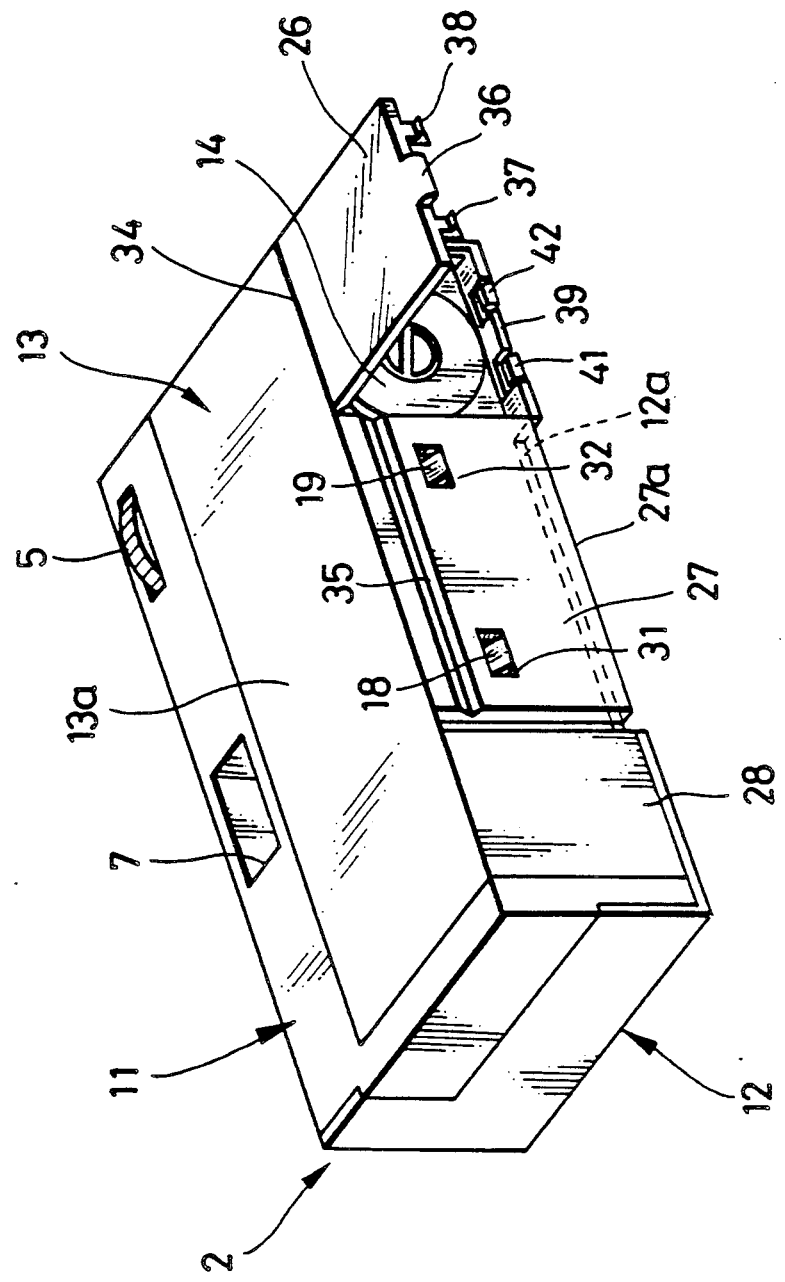
FIG. 3 is a perspective rear view of the film housing with its bottom lid open.

As shown in FIG. 3, the bottom lid 26 has a thin wall portion along the bottom edge 34, that is, the corner of the L-shaped rear cover 13, so that the bottom lid 26 can pivot about this thin wall portion. A free end of the bottom lid 26 opposite the corner 24 has a tab 36 and engaging claws 37 and 38 formed integrally therewith. On the other hand, the front cover 12 is formed with a cut-out 39 in an area corresponding to the tab 36, as well as projections 41 and 42 in respective areas corresponding to the engaging claws 37 and 38. The projections 41 and 42 have each a tapered end surface such that a snap-in connection between the engaging claws 37, 38 and the projections 41, 42 is made when the bottom lid 26 is pushed closed onto the main body 11, whereby the bottom lid 26 engages with the front cover 12. In this state, the bottom lid 26 closes the cassette chamber 15 in light-tight fashion. When opening the bottom lid 26 in order to take out the film cassette 14 contained in the cassette chamber 15, the tab 36 is pushed by a fingernail thereby to snap out the engaging claws 37 and 38 from the projections 41 and 42. The bottom lid 26 may be formed as a separate piece that can be snapped in the bottom of the cassette chamber 15.

Next, the assembling process of the above-described film package 1 will be briefly described.

The exposure mechanisms such as the taking lens 8, the shutter and the film advancing mechanism are firstly mounted on the main body 11. Thereafter, the front cover 12 is attached to the front of the main body 11. The front cover 12 is intended not only to cover the exposure mechanisms but also to hold the taking lens 8 on the main body 11. Therefore, the front cover may be cemented to the main body 11 so as not to be detachable from the main body 11.

After the attachment of the front cover 12, the unexposed film 16 is pulled out from the film cassette 16 and is wound in a roll 16a. The trailing end of the film 16 is fitted to a spool 14a of the film cassette 14. The cassette 14 and the film roll 16a are inserted in the cassette chamber 15 and the film roll chamber 17, respectively. Thereafter, the rear cover 13 is attached to the main body 11, thereby to close the rear and bottom sides of the main body 11 in a light-tight fashion.

When attaching the rear cover 13, the projections 24 and 25 are inserted somewhat diagonally into the engaging holes 21 and 22 of the main body 11. Then, the back wall portion 13a of the rear cover 13 is pushed onto the main body 11, whereby the engaging holes 31 and 32 of the center cover plate 27 are caught on the engaging claws 18 and 19. At that time, the center cover plate 27 bends a little along the groove 35 to clear the engaging claws 18 and 19. The bottom lid 26 is then closed on the bottom of the cassette chamber 15 thereby to engage the engaging claws 37 and 38 with the projections 41 and 42. The film loading and the rear cover attachment are carried out in a darkroom. After being assembled in the above-described manner, the film housing 2 is packed in the outer casing 3. The assembling process can be performed by means of an automatic assembling apparatus.

For taking pictures, it is unnecessary to remove the outer casing 3 from the film housing 2 in order to operate the film package 1. Upon depression of the shutter release button 4, the shutter is actuated to allow the light passing through the taking lens 8 to reach the film 16 disposed behind the exposure opening 20a. By rotating the film advancing wheel 5 after the exposure, the exposed area of the film 16 is wound up into the film cassette 14 and, at the same time, an unexposed area of the film 16 is positioned behind the exposure opening 20a. When all the available frames have been exposed, the entire length of the film 16 has been wound back into the film cassette 14.

After the completion of exposure, the film package 1 is forwarded to a photofinishing laboratory, wherein the outer casing 3 is removed from the film housing 2 and, thereafter, the bottom lid 26 is opened to take out the film cassette 14 through the bottom of the cassette chamber 15. The film cassette 14 is subjected to a conventional photographic processing. After the removal of the film cassette 14, the film housing 2 is forwarded to a film package factory or the like for reuse.

In the factory, the rear cover 13, which hinders the loading of a new film, is detached from the main body 11 in a manner as described above. That is, the center cover plate 27 is bent along the groove 35 by applying force to the free end 27a thereof in a direction to remove the center cover plate 27 from the main body 11, whereby the engaging holes 31 and 32 are disengaged from the engaging claws 18 and 19. Needless to say, the center cover plate 27 may be broken along the groove 35 if it is bent to a certain degree. By pulling the rear cover 13 diagonally from the main body 11, the projections 24 and 25 are slid out of the engaging holes 21 and 22. In this way, the rear cover 13 can be easily detached from the main body 11 without damaging the main body 11 and the front cover 12, the front cover 12 remaining attached to the main body 11 at all times.

Next, it is determined whether the photographic function of the main body is normal, and only those main bodies determined to be normal are used. During reuse, the film frame counter 9 of the main body 11 is reset to its initial position. Then, a new photographic film is reloaded in a manner as described above. After reloading, a new rear cover is attached to the main body 11. By packing the reconstructed film housing containing the new film in a new outer casing, a new film package is provided. The new film packages comprising the reused parts will be on the market together with other new film packages. The rear cover 13 removed from the main body 11 of the used film package 1 is melted to be again molded into a new rear cover or the like. It is to be noted that it is easy to automate the detachment process of the rear cover 13 because the rear cover is easily removed by applying only a small force to the center cover plate 27 in a predetermined direction.

Figure 4:
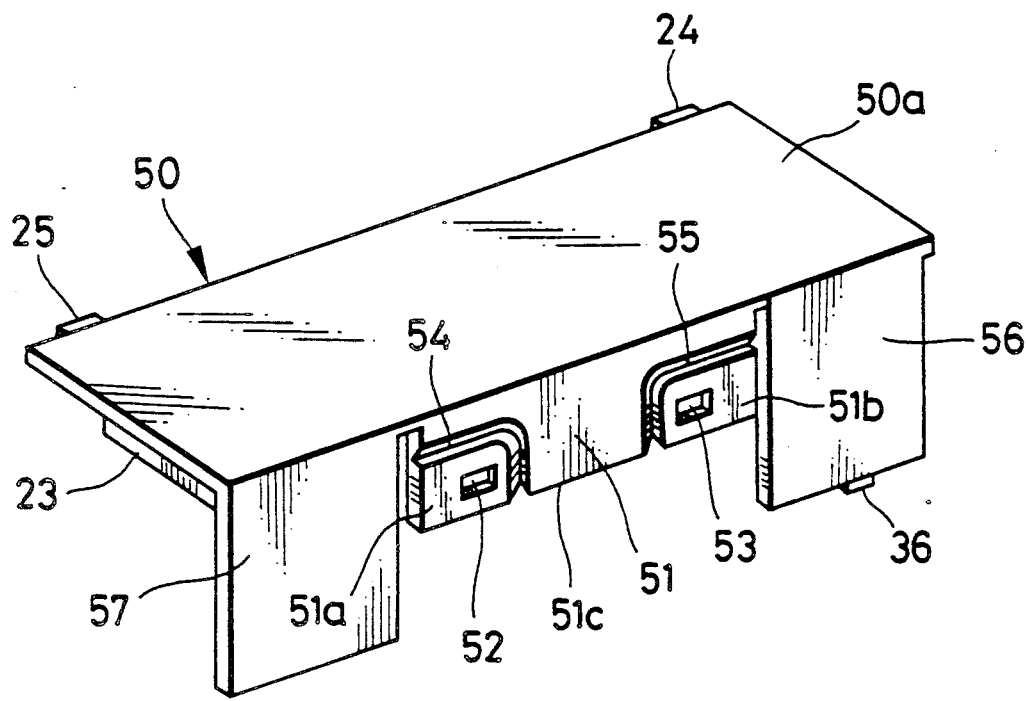
FIG. 4 is a perspective view of the rear cover of a first embodiment wherein grooves are formed around engaging holes.

FIG. 4 shows another embodiment of a rear cover 50. The rear cover 50 has a center cover plate 51 of a size that corresponds to the size of the bottom plate 11a of the main body 11. The cover plate 51 has also engaging holes 52 and 53, and grooves 54 and 55 extending about the engaging holes 52 and 53 respectively along a substantially L-shaped line. When detaching the rear cover 50 from the main body 11, by pulling a free end 51c thereof away from the main body 11, the cover plate 51 is broken along the grooves 54 and 55, whereby the rear cover 50 can be pulled from the main body 11 in the manner as above. After the detachment of the rear cover 50, rectangular chips 51a and 51b are still held on the engaging claws 18 and 19 of the main body 11, but these clips 51a and 51b are easily removable from the engaging claws 18 and 19 through the engaging holes 52 and 53. The front cover 12 is still attached to the main body 11. Consequently, a film package having the rear cover 50 can be reused in the same way as in the embodiment shown in FIG. 2. Designated by 50a is a back wall portion of the rear cover 50, while 56 and 57 are bottom cover plates for closing the cassette chamber 15 and the film roll chamber 17 in light-tight fashion.

Figure 5:
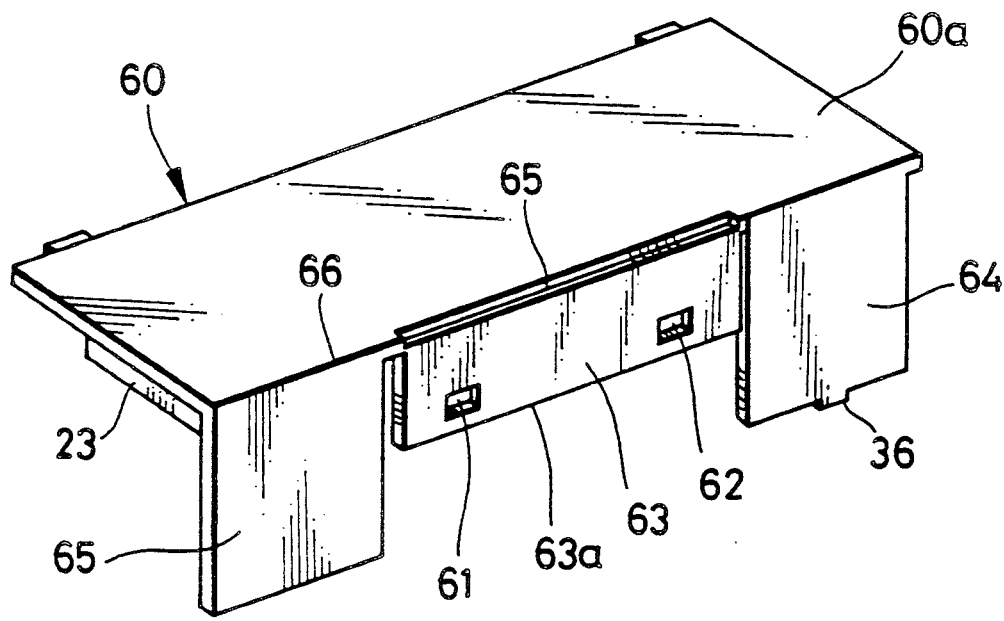
FIG. 5 is a perspective view of the rear cover of a second embodiment wherein a groove is formed on the border between the rear wall portion and the bottom wall portion of the rear cover.

A rear cover 60 shown in FIG. 5 has a groove 65 formed along a corner 66 of the L-shaped rear cover 60. When detaching the rear cover 60, a screwdriver or the like is inserted between a center cover plate 63 of the rear cover 60 and the bottom plate 11a of the main body 11 from a free end 63a of the center cover plate 63, and then the center cover plate 63 is pulled up from the main body 11, whereby the groove 65 is deformed to make engaging holes 61 and 62 disengage from the engaging claws 18 and 19. Designated by 60a is a back wall portion of the rear cover 60, while 64 and 65 are bottom cover plates.

Figure 6:
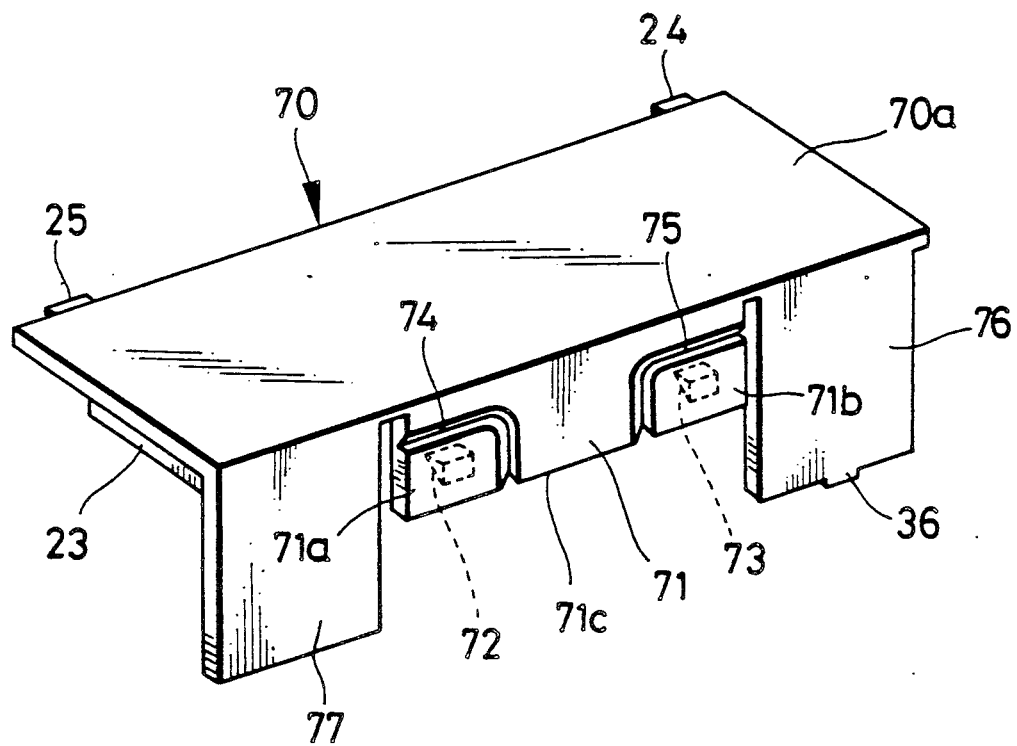
FIG. 6 is a perspective view of the rear cover of a third embodiment wherein grooves are formed around engaging claws.

A rear cover 70 shown in FIG. 6 has engaging claws 72 and 73 formed on the inner surface integrally therewith, and the same grooves 74 and 75 as the grooves 54 and 55 of FIG. 4 are formed in the periphery of the chips 71a and 71b. The main body 11, on the other hand, has engaging holes (not shown) to be engaged with the engaging claws 72 and 73. The rear cover 70 can be detached from the main body 11 in the same way as for the embodiment of FIG. 4. Because the engaging holes are formed in the main body 11 in this embodiment, the rear cover 70 can be securely removed. Namely, if engaging claws were formed on the main body, they could be broken by mistake during detachment of the rear cover, because these engaging claws would protrude toward the rear cover side. Provision of the engaging holes in the main body will prevent this. Designated by 70a is a back wall portion of the rear cover 70, while 76 and 77 are bottom cover plates.

In the embodiment of FIG. 1 wherein the distance from the groove 35 to the free end 27a is rather large relative to the distance from the groove 35 to the engaging holes 31 and 32, it is necessary for disengaging the engaging claws 18 and 19 from the engaging holes 31 and 32 to move the free end 27a correspondingly far. However, according to the embodiment of FIG. 5, the distance from the free end 63a to the holes 61 and 62 is so short that the center cover plate 63 will be disengaged from the main body 11 by moving the center cover plate 63 a relatively short distance from the main body 11.

Figure 7:
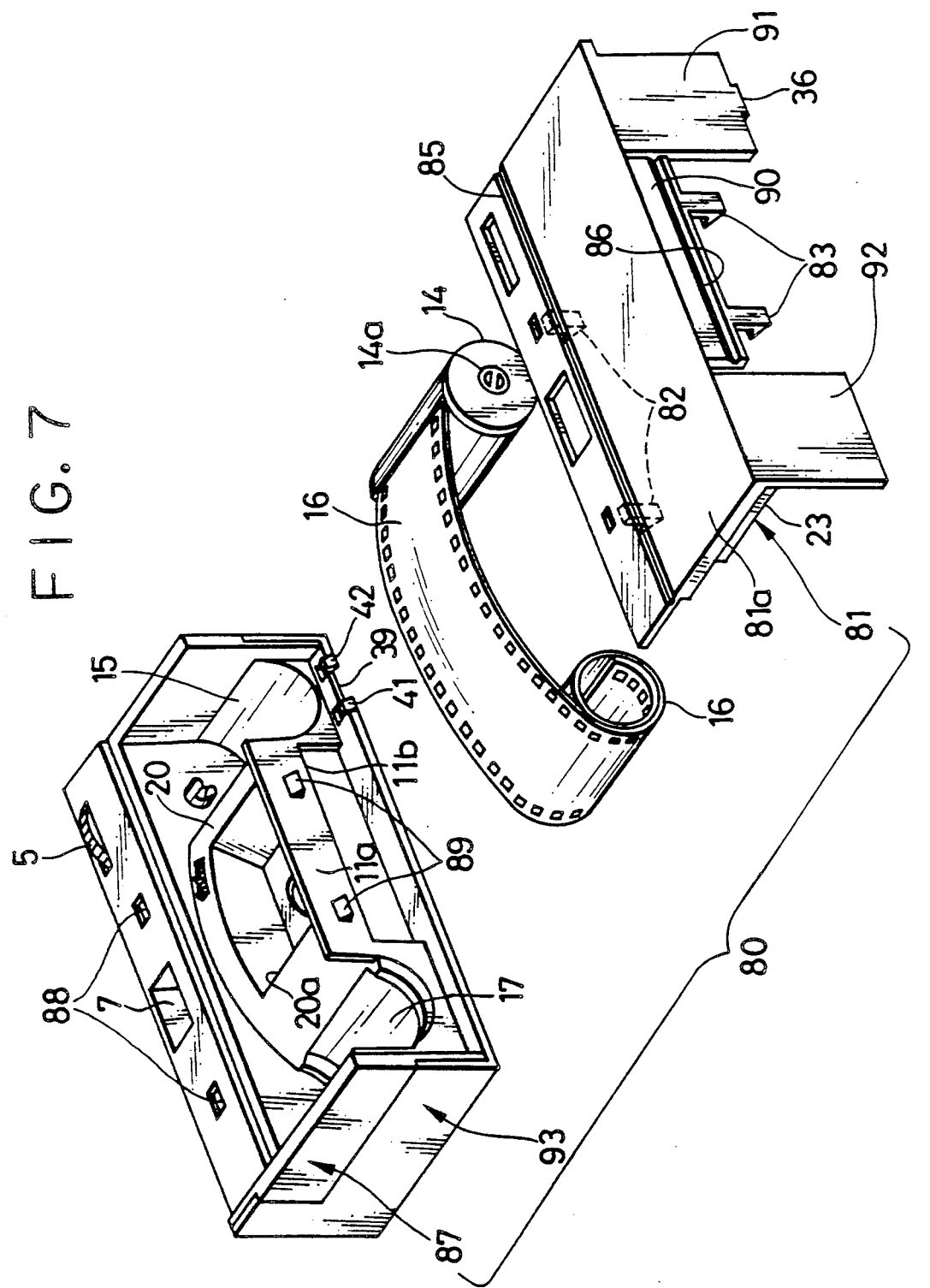
FIG. 7 is an exploded perspective view of a film housing according to a fifth embodiment wherein the rear cover is formed with engaging holes as well as grooves.

FIG. 7 shows another embodiment of a film housing 80 wherein both of main body 87 and rear cover 81 are provided with engaging claws. The rear cover 81 has a pair of engaging claws 82 and a groove 85 formed on a back wall portion 81a, as well as another pair of engaging claws 83 and a groove 86 formed on a center cover plate 90. The engaging claws 82 engage with engaging holes 88 of the main body 87, whereas the engaging claws 83 engage with engaging claws 89 on the main body 87. When assembling the film package 80, the engaging claws 82 of the rear cover 81 are inserted somewhat diagonally into the engaging holes 88 and, thereafter, the rear cover 81 is slid slightly toward the look-in finder window 7. Next, the back wall portion 81a of the rear cover 81 is pressed onto the main body 87, whereby the engaging claws 83 slide over the engaging claws 89 while being resiliently bent to a corresponding degree, and snap back into engagement with the undersides of the engaging claws 89.

When detaching the rear cover 81 from the main body 87, a screwdriver or the like is placed against either of the engaging claws 83 as to push it in a direction to remove the same from engagement with the engaging claws 89. Under the force applied in this direction, the center cover plate 90 is bent along the groove 86, so that the engaging claws 83 are disengaged from the engaging claws 89. By further pulling up the center cover plate 90, the back wall portion 81a is further bent along the groove 85. By pulling out the engaging claws 82 from the engaging holes 88, all portions of the rear cover 81 are removed from the main body 87. After the detachment of the rear cover 81, the main body 87 is reused to assemble a new film package as described above. Designated by 91 and 92 are bottom cover plates for closing the chambers 15 and 17 in light-tight fashion. It is to be noted that the bottom cover plate 91 is pivotally openable as the bottom lid 26 of FIG. 1, as well as the bottom cover plates 56, 64, 76.

Figure 8:
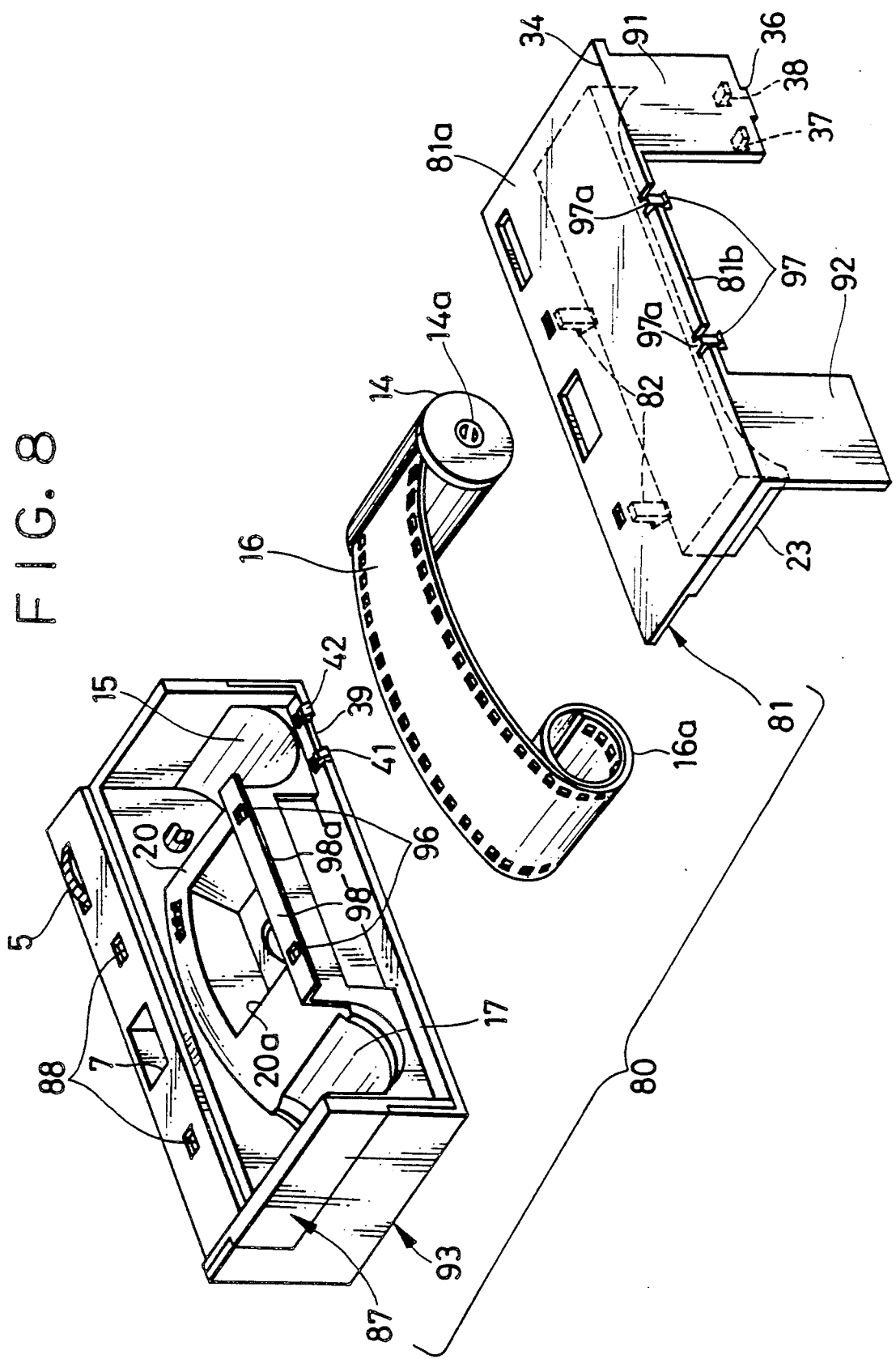
FIG. 8 is an exploded perspective view of a film housing according to a sixth embodiment.
Figure 9:
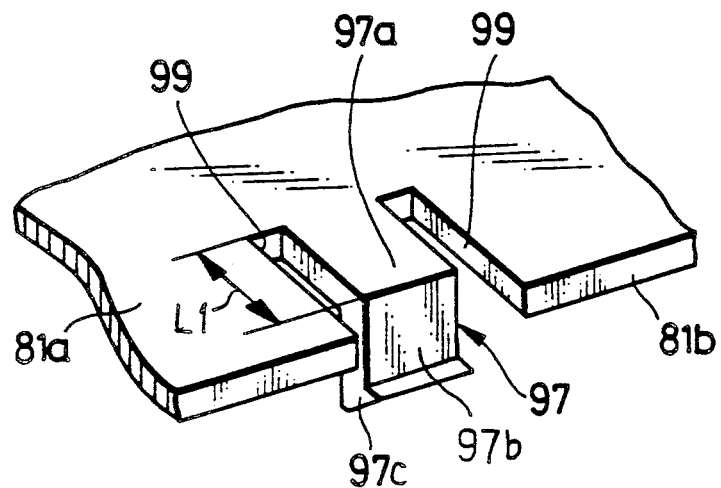
FIG. 9 is an enlarged perspective view showing the engaging claw shown in FIG. 8.
Figure 10:
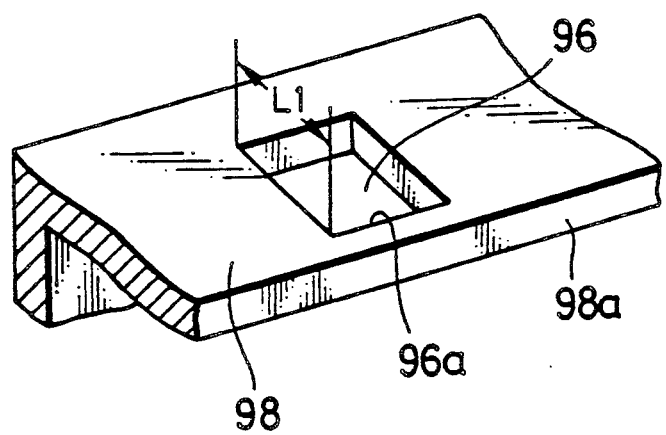
FIG. 10 is an enlarged perspective view showing the engaging hole shown in FIG. 8.

FIGS. 8 to 12 show still another embodiment that facilitates the disengagement of engaging claws. As shown in FIG. 9, the rear cover 81 is provided with a pair of engaging claws 97 on its back wall portion 81a, these engaging claws 97 each being of L-shape and comprising an upper arm portion 97a and a lower arm portion 97b with a claw portion 97c. The upper arm portion 97a is flush with the back wall portion 81a, and thus forms a part of the back wall portion 81a parted therefrom through two parallel slits 99 formed on opposite sides of the upper arm portion 97a. As shown in FIGS. 8 and 10, an L-shaped bottom plate 98 having a pair of engaging holes 96 is formed integrally with the main body 87. The length L1 of each engaging hole 96 is equal to the length L1 of the slit 99. Instead of cutting out the two slits 99, it is possible to cut out a slit surrounding the base portion of the engaging claw 97 on three sides.

Figure 11:
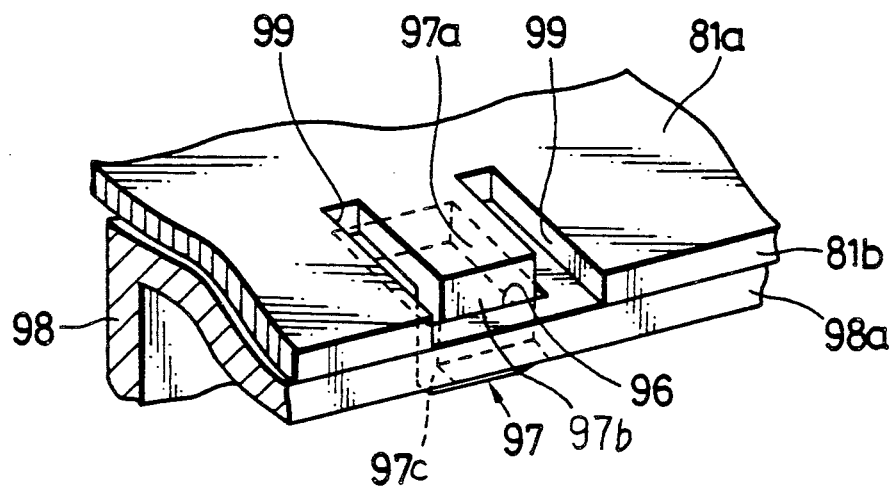
FIG. 11 is an enlarged perspective view showing the engagement between the engaging claw of FIG. 9 and the engaging hole of FIG. 10.
Figure 12:
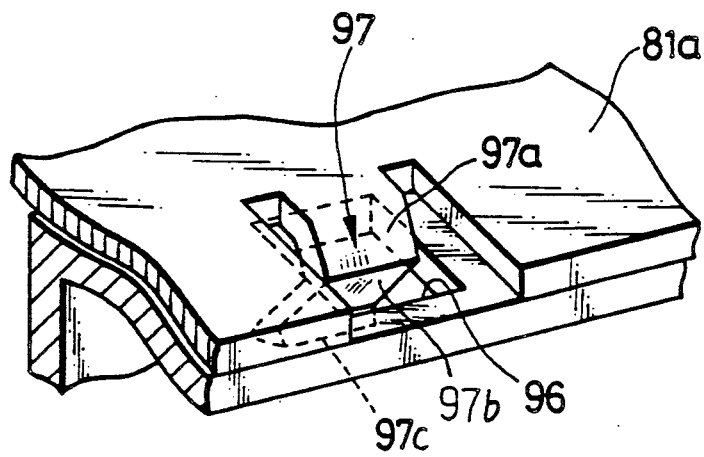
FIG. 12 is an enlarged perspective view similar to FIG. 11 but showing the disengagement of the claw from the hole.

The rear cover 81 is attached to the main body 87 in the same way as in the embodiment of FIG. 7. When the engaging claws 97 are engaged with the engaging holes 96, a tapered surface of the claw portion 97c slides on a margin 96a of the engaging hole 96, while the upper arm portion 97a is resiliently bent or deformed correspondingly. When the lower arm portions 97b snap back on the margin 96a, the back wall portion 81a that the end surface 81b is in alignment with an end surface 98a of the bottom plate 98, as shown in FIG. 11.

According to the embodiment of FIGS. 8 to 12, in order to detach the rear cover 81 from the main body 87, the upper arm portion 97a is depressed into its engaging hole 96 while pushing the outer surface of the upper arm portion 97a by a screwdriver or the like. As a result, the upper arm portion 97a is resiliently bent inwards of the engaging holes 96, and the claw portion 97c is disengaged from the engaging hole 96. Since the frequency of breaking the engaging claws 97 is relatively low, it may be possible directly to reuse the rear cover 81 as well as the main body 87.

Figure 13:
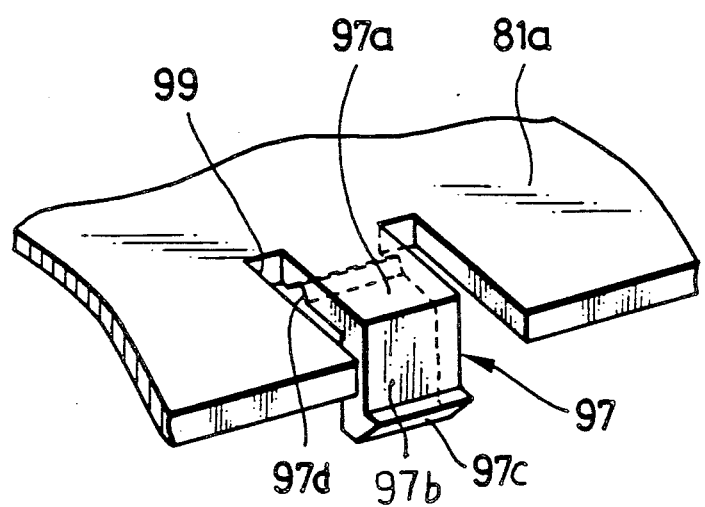
FIG. 13 is an enlarged perspective view of an engaging claw having a groove formed in its upper arm portion.

According to an embodiment shown in FIG. 13, a groove 97d is formed in the upper arm portion 97 near the base thereof so as to facilitate the deformation of the upper arm portion 97a. If the groove 97d is rather deep, the upper arm portion 97a could of course be broken by bending it along the groove 97d and, in such a case, the rear cover 81 would not be directly reusable.

The engaging mechanism consisting of the above engaging holes 96 and the engaging claws 97 can be used to engage the bottom lid 91 with the main body 87 in place of the claws 37, 38 and 41, 42 shown in FIG. 3. This engaging mechanism can also replace the engaging mechanism consisting of the engaging claws 82 and the engaging holes 88. In another type of film package wherein a photographic film can be loaded in and taken out through the bottom of the film housing, the engaging mechanism consisting of the engaging holes 96 and the engaging claws 97 can be used to engage a bottom cover with a main body because the bottom cover functions as a light-shielding cover. In this type of film package, a back wall portion is cemented or removably attached to the rear of the main body, and a new film can of course be loaded in the main body without separating the back wall portion therefrom.

The above embodiments relate to film packages of the type having a film cassette in a cassette chamber, that is, a film take-up chamber for enabling the removal of the exposed film in ambient light. However, the exposed film may be rewound frame by frame on a take-up spool provided in a film take-up chamber and rotatable by a film advancing wheel instead of being rewound into such a film cassette. In this case, the film take-up chamber has a light-trapping member such as plush disposed in the exit thereof, and the naked film wound on the take-up spool is taken out from the film package in a darkroom.

In a film package having a built-in flash device, it is preferable to provide a battery chamber such that the battery of the flash device is directly exposed when a light-shielding cover is opened. In this way, it is easy to replace the old battery with a new one before reloading a film. Although, in the above embodiment, the rear cover is detached after the film cassette containing the exposed film is taken out, it is possible to take out the film cassette after detachment of the rear cover. In such a case, the bottom cover plate closing the bottom of the cassette chamber need not be pivotally openable. Further, in this embodiment, the bottom cover plates for the cassette chamber and the film roll chamber may be formed integrally with the main body or the front cover.

It will be understood that the present invention is not limited to the above-described embodiments, and that various modifications within the scope and spirit of the appended claims will be apparent to people skilled in the art.

What is claimed is:

1. A lens-fitted photographic film package in which exposure mechanisms are incorporated, having a main body loaded with a photographic film and a light-shielding cover attached to said main body in light-tight fashion, said film package comprising:

at least a first engaging means provided in said main body;

at least a second engaging means provided in said light-shielding cover, said second engaging means engaging with said first engaging means; and a thin wall portion provided in said light-shielding cover near said second engaging means, said thin wall portion being deformable by external force applied to said second engaging means such that said second engaging means is disengageable from said first engaging means, thereby facilitating detachment of said light-shielding cover from said main body.

2. A lens-fitted photographic film package as defined in claim 1, wherein said light-shielding cover and said second engaging means are integrally formed as one body by plastic molding.

3. A lens-fitted photographic film package as defined in claim 2, wherein said thin wall portion is a groove.

4. A lens-fitted photographic film package as defined in claim 1, wherein one of said first and second engaging means is an engaging claw, while another is an engaging hole.

5. A lens-fitted photographic film package as defined in claim 4, wherein said first engaging means is an engaging hole, and said second engaging means is an engaging claw.

6. A lens-fitted photographic film package as defined in claim 1, wherein said main body comprises an exposure opening, a cassette chamber and a film roll chamber disposed on opposite sides of said exposure opening, said cassette chamber containing a film cassette, and said film roll chamber containing a photographic film pulled out from said film cassette and wound into a roll.

7. A lens-fitted photographic film package as defined in claim 6, wherein said light-shielding cover comprises a back wall portion and a first bottom wall portion formed integrally with each other as an L-shaped body, said back wall portion closing said exposure opening, an open rear side of said cassette chamber and an open rear side of said film roll chamber, and said first bottom wall portion being fitted onto a center bottom portion of said main body.

8. A lens-fitted photographic film package as defined in claim 7, wherein said back wall portion has a projection formed in an upper area thereof, said projection being inserted into a hole formed in said main body.

9. A lens-fitted photographic film package as defined in claim 7, further comprising a front cover section attached to a front of said main body, said front cover section having a cut-out formed in a center bottom edge of said front cover section, said cut-out exposing an end surface of said bottom wall portion extending up to said front cover section.

10. A lens-fitted photographic film package as defined in claim 7, wherein said cassette chamber and said film roll chamber of said main body have open bottom ends, and said light-shielding cover further comprises a second bottom wall portion and a lid which are disposed on opposite sides of said first bottom wall portion and formed integrally with said light-shielding cover, said second bottom wall portion closing said open bottom end of said film roll chamber in light-tight fashion, whereas said lid openably closes said open bottom end of said cassette chamber.

11. A lens-fitted photographic film package as defined in claim 7, wherein said second engaging means is formed in said first bottom wall portion, and said groove is disposed between said second engaging means and a joint between said first bottom wall portion and said back wall portion, said joint traversing linearly said first bottom wall portion.

12. A lens-fitted photographic film package as defined in claim 7, wherein said second engaging means is formed in said first bottom wall portion, and said groove extends about each said second engaging means along an L-shaped line.

13. A lens-fitted photographic film package as defined in claim 7, wherein said second engaging means is formed in said first bottom wall portion, and said groove is formed along a corner between said first bottom wall portion and said back wall portion.

14. A lens-fitted photographic film package in which 1 exposure mechanisms are incorporated, having a main body loaded with a photographic film and a light-shielding cover attached to said main body in light-tight fashion, said film package comprising:
    engaging means for attaching said light-shielding cover to said main body, said engaging means comprising an engaging claw and an engaging hole engaging with said engaging claw;
    said engaging claw being disposed at an edge of one of said light-shielding cover and said main body and having an L-shape consisting of an upper arm portion and a lower arm portion, said upper arm portion forming a part of said one of said light-shielding cover and said main body and being parted therefrom through two slits formed on opposite sides of said upper arm portion, and said lower arm portion perpendicularly protruding from said edge and having a claw portion at a free end thereof; and
    said engaging hole being large enough to allow a deformation of said engaging claw inserted therein, said deformation making said claw portion disengageable from a part of said engaging hole.

15. A lens-fitted photographic film package as defined in claim 14, wherein said main body comprises an exposure opening, a cassette chamber and a film roll chamber disposed on opposite sides of said exposure opening, said cassette chamber containing a film cassette, and said film roll chamber containing a photographic film pulled out from said film cassette and wound into a roll.

16. A lens-fitted photographic film package as defined in claim 15, wherein said light-shielding cover comprises a back wall portion closing said exposure opening, an open rear side of said film cassette and an open rear side of said film roll chamber, an openable lid and a bottom wall portion closing a bottom end of said cassette chamber and a bottom end of said film roll chamber, respectively, in light-tight fashion.

17. A lens-fitted photographic film package as defined in claim 16, wherein said engaging claw is formed on a bottom edge of said back wall portion integrally therewith by plastic molding.

18. A lens-fitted photographic film package as defined in claim 17, wherein said engaging claw has a groove formed near a base thereof for facilitating deformation of said engaging claw.

* * * * *